Patented June 15, 1926.

1,588,483

UNITED STATES PATENT OFFICE.

JOSEPH MERRITT MATTHEWS, OF NEW YORK, N. Y., ASSIGNOR TO GLORIENT, INC., OF NEW YORK, N. Y., A CORPORATION OF NEW YORK.

DYE COMPOSITION.

No Drawing.   Application filed November 8, 1924.   Serial No. 748,768.

This invention relates to dye compositions and particularly to a self contained water soluble dry powder composition for household use in dyeing silk goods.

While there are a number of such compositions on the market for cotton, I am not aware of any especially for dyeing silk goods having the necessary requirements of fast dyeing by simple immersion and non-hygroscopicity and stability when packaged for retail trade. Such an article should also be readily and completely soluble, and should not leave specks which tend to spot the goods.

According to this invention, a stable, water soluble dye composition powder accomplishing the above objects and having the above advantages is obtained by combining with an acid dye incapable of being precipitated by free acid or a leveling agent, a solid soluble organic material supplying free acid in the dye solution, and a leveling agent. A suitable solid soluble acid supplying material is fumaric acid or tartaric acid and a suitable leveler is tartar (potassium bitartar or potassium bitartrate), neither of which precipitate dyes suitable for dyeing silk goods according to this invention. This invention is applicable to the dyeing of pure silk goods, or to goods in part of other fibres, a particular advantage of the invention being that the dyes used have no affinity in acid solution for vegetable fibre and consequently will not stain cotton, lace, etc. on silk garments.

A suitable composition, as for pink, is:

|  | Grams. |
|---|---|
| Scarlet 2 R | 3 |
| Fast crimson G R | 3 |
| Pure fumaric acid | 300 |
| Tartar (potassium bitartrate) | 100 |

If tartaric acid is used in the above formula, about 600 grams will supply the requisite acidity and leveling agent. These materials are mixed dry and ground into a uniform and very fine powder. The powder is then dessicated to remove moisture, and then packed and sealed in moisture proof paper envelopes for the market. These packages keep indefinitely in good condition without decomposition or caking.

The function of the fumaric acid or tartaric acid is to release free acid in the solution and it also acts as a mordant on silk and helps to fix a faster color. It also makes the silk fibre more lustrous and gives it a body and a scroop that is desirable, especially in garments which are redyed after use. The tartar with fumaric acid, or some of the tartaric acid, causes the color to be taken up more evenly and assists in mordanting the silk fibre. The proportion of fumaric acid or tartaric acid may vary between limits, the amount employed depending on the particular dyes used and the depth of shade required. For heavy shades, up to 75 gr. of dye stuff may be used to 300 gr. of fumaric acid or 600 gr. of tartaric acid. Fumaric acid works very well because of its stability in the dry mixture, and desirable acidity in solution.

This composition is completely soluble in warm or hot water without residue and does not leave specks on the goods. The hotter the water the better, as the color is more fast and penetrates better. The goods are first cleaned in neutral soap, then washed several times in warm water to remove the soap.

The dyeing process takes from 10 to 25 minutes, depending on the depth of shade and color. The goods are finished after rinsing well in warm water and drying.

This application is a continuation in part of my application filed May 29, 1924, Serial No. 716,573.

I claim:

1. A stable dry powder water soluble silk dye composition comprising an acid dye incapable of being precipitated in the presence of a solid soluble organic acid and a leveling agent, a solid soluble organic acid capable of causing the acid dye to combine with silk fiber, and a leveling agent, said composition being readily and completely soluble in warm water and being non-hygroscopic and non-caking when packed.

2. A stable dry powder water soluble silk dye composition comprising an acid dye incapable of being precipitated in the presence of fumaric acid and potassium bitartrate, fumaric acid, and potassium bitartrate, said composition being readily and completely soluble in warm water and being non-hygroscopic and non-caking when packed.

Signed at New York, in the county of New York, and State of New York, on this 6th day of November, A. D. 1924.

JOSEPH MERRITT MATTHEWS.